Feb. 17, 1931. W. J. GREUTMAN 1,792,535
WIRE FENCE STRETCHER
Filed July 30, 1928
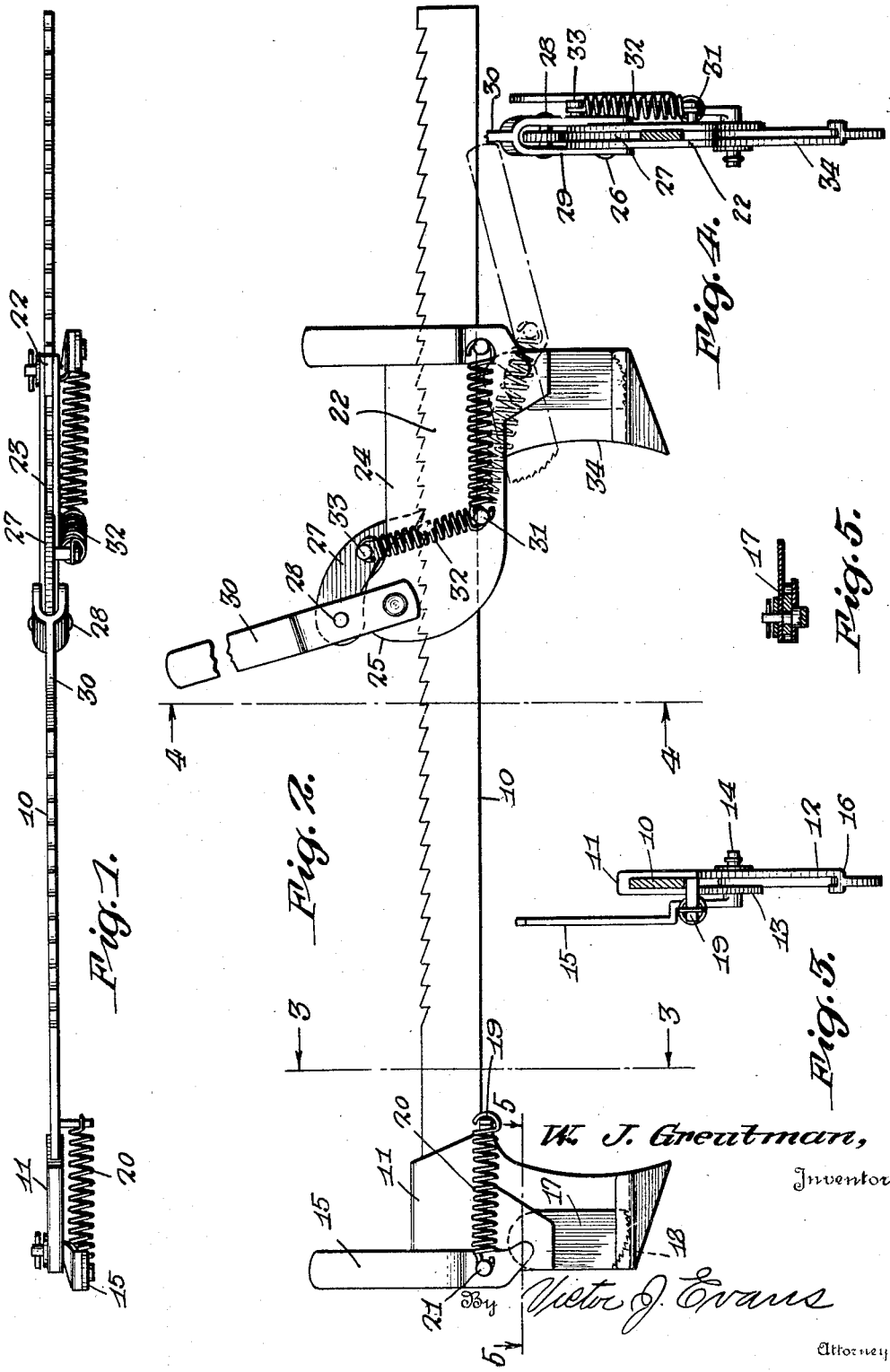

Patented Feb. 17, 1931

1,792,535

UNITED STATES PATENT OFFICE

WILLIAM J. GREUTMAN, OF MILLER, NEBRASKA

WIRE-FENCE STRETCHER

Application filed July 30, 1928. Serial No. 296,161.

This invention relates to improvements in stretchers primarily adapted for stretching wire and the like.

An object of the invention comprehends means adapted to stretch wire in either direction from a given position.

Another object of the invention contemplates holding elements.

A further object of the invention consists in the provision of spring elements adapted to selectively retain the holding elements in open or closed positions.

More specifically stated the device is provided with work engaging portions from and to which the wire may be stretched.

With the above and other objects in view, the invention further consists of the following novel features and details of construction, to be hereinafter more fully described, illustrated in the accompanying drawing, and pointed out in the appended claim.

In the drawing:—

Figure 1 is a top plan view of the invention.

Figure 2 is a side elevation thereof.

Figure 3 is a horizontal sectional view taken on line 3—3 of Figure 2.

Figure 4 is a view similar to Figure 3 taken on line 4—4 of Figure 2.

Figure 5 is a horizontal sectional view taken through one of the holding elements.

Referring to the drawing in detail, wherein like characters of reference denote corresponding parts, the reference character 10 indicates a rack bar of relatively flat elongated configuration adapted to repose one end thereof within the channel of a U-shaped plate or yoke 11.

The long and short legs 12 and 13 of the yoke 11 are provided with registering apertures adjacent the end of the leg 13 to accommodate a trunnion 14 offset at right-angles upon one end of a lever 15, substantially as illustrated in Figure 3 of the drawing. A groove 16, provided adjacent the end of the long leg 12 of the yoke 11 and horizontally disposed thereon, is disposed in line with the channel of the yoke. A locking dog 17, having its innermost end disposed within the remaining channel portion of the yoke 11, is fixed or otherwise secured upon that portion of the trunnion 14 extended between the legs 12 and 13. The outermost end 18 of the locking dog 17 is curved and toothed for biting engagement with the groove 16 in the long leg 12.

A lug 19, carried by and disposed at right-angles to the yoke 11, is adapted to accommodate one end of a retractile spring 20, which in turn has its opposite end hooked over a stud bolt 21 upon the lever 15. The spring 20 is adapted to dispose the locking dog 17 in either open or closed positions inasmuch as the particular end of the spring having connection with the lever 15 is eccentrically disposed with relation to the trunnion 14.

A companion yoke 22, constructed after the manner of the yoke 11, has the major portion of its closed end slotted, as at 23, the purpose of which will be presently apparent. Companion ears 24, projected from the legs of the yoke 22 upon the opposite faces of the rack bar 10, terminate to provide upstanding extremities 25 through which a pivot pin 26 is passed above the teeth of the rack bar 10. A pawl 27, pivotally mounted, as at 28, within the bifurcated end 29 of a ratchet lever 30, carried by the pivot pin 26, is adapted for engagement with the teeth of the rack bar through the slot 23 in the yoke 22.

A stud bolt 31, carried by the companion ears 24, is adapted to serve the same purpose of the leg 19 upon the yoke 11. An additional spring element 32, carried upon the aforementioned stud bolt 31, is adapted for connection at its opposite end with a headed stud 33 included upon the pawl 27 to normally induce the latter toward the teeth of the rack bar 10.

As illustrated in Figure 2 of the drawing, the inner side edges of the yokes 11 and 22 respectively are curved, as at 34, upon the longer legs thereof to fit around posts from and to which wire is to be stretched.

From the foregoing description and accompanying drawing, it is to be noted that wire is to be inserted within the grooves of the longer legs upon the yokes 11 and 22 whereas the locking dogs therefor are adapted to retain the wire against displacement therein. The post may be disposed between the longer legs of the yoke and engaged by either one, according to the direction in which the wire is being stretched irrespective of the position of the ratchet lever 30. In other words, the wire may be stretched in either direction upon a post by contacting engagement with either of the yokes without necessitating reversal of the yoke 22 and the ratchet member carried thereby. For this reason, only one row of teeth is required upon a single edge of the rack bar.

Inasmuch as the locking dogs 17 for either of the yokes are separate and apart from the levers therefor, the same may be readily replaced and retoothed when necessary.

The invention is susceptible of various changes in its form, proportions and minor details of construction and the right is herein reserved to make such changes as properly fall within the scope of the appended claim.

Having thus described the invention, what is claimed is:—

A wire stretcher comprising a relatively flat elongated rack bar, yoke members fixed and slidably mounted thereon, levers pivotally mounted upon the yokes terminating to provide trunnions extended through the yokes, the yokes having grooves remotely disposed from the trunnions, locking dogs carried by and operable in conjunction with the trunnions of the levers being adapted to be moved toward and away from the yoke grooves, spring elements carried by the yokes eccentrically connected with the levers to selectively retain the locking dogs in open and closed positions, a ratchet member carried by the movable yoke having operative engagement with the rack bar, and post engaging portions provided upon the innermost and adjacent sides of the yokes terminating in pointed projections.

In testimony whereof I affix my signature.

WILLIAM J. GREUTMAN.